United States Patent
Lopez Ruiz et al.

(10) Patent No.: US 12,390,045 B2
(45) Date of Patent: Aug. 19, 2025

(54) SYSTEM AND METHOD FOR FOAMING MILK

(71) Applicant: Azkoyen, S.A., Peralta (ES)

(72) Inventors: Jose Maria Lopez Ruiz, Peralta (ES); Luis María Lumbier Moleres, Peralta (ES)

(73) Assignee: Azkoyen, S.A., Peralta (ES)

( * ) Notice: Subject to any disclaimer, the term of this patent is extended or adjusted under 35 U.S.C. 154(b) by 435 days.

(21) Appl. No.: 17/758,038

(22) PCT Filed: Dec. 28, 2020

(86) PCT No.: PCT/EP2020/087925
§ 371 (c)(1),
(2) Date: Jun. 27, 2022

(87) PCT Pub. No.: WO2021/130389
PCT Pub. Date: Jul. 1, 2021

(65) Prior Publication Data
US 2023/0055252 A1   Feb. 23, 2023

(30) Foreign Application Priority Data
Dec. 27, 2019   (EP) .................................. 19383206

(51) Int. Cl.
*A47J 31/44*   (2006.01)
*A23C 9/152*   (2006.01)
*A47J 31/40*   (2006.01)

(52) U.S. Cl.
CPC ......... *A47J 31/4489* (2013.01); *A23C 9/1524* (2013.01); *A47J 31/401* (2013.01)

(58) Field of Classification Search
CPC .......................... A23C 9/1524; A47J 31/4489; A47J 31/401; A47J 31/4496
(Continued)

(56) References Cited

U.S. PATENT DOCUMENTS

2008/0166463 A1 * 7/2008 Green ................. A47J 31/4485
99/287
2010/0075007 A1   3/2010 Schindler et al.
(Continued)

FOREIGN PATENT DOCUMENTS

EP          3040000 A1      7/2016

OTHER PUBLICATIONS

International Search Report for International Application No. PCT/EP2020/087925, "System and Method for Foaming Milk" date of mailing: Mar. 18, 2021.
(Continued)

*Primary Examiner* — Subbalakshmi Prakash
(74) *Attorney, Agent, or Firm* — Jeffrey N. Townes; Cozen O'Connor

(57) ABSTRACT

The system for foaming milk comprises a container (2) for milk; an air inlet (3); a pump (4), wherein liquid milk is mixed with the air in order to produce foamed milk; and an outlet (6), wherein foamed milk is supplied, wherein the container is a container for powdered milk, and wherein the system for foaming milk further comprises a tank (8) for water and a premixing chamber (9). In the method for foaming milk, the milk is provided as powdered milk and is premixed with water in order to provide liquid milk which is mixed with the air in order to produce foamed milk. It enables a system and method for foaming milk to be provided which achieves the foaming of the milk with a "gel" effect from dehydrated powdered milk, the durability of which is much greater than liquid milk.

8 Claims, 1 Drawing Sheet

(58) Field of Classification Search
USPC .......................................................... 426/477
See application file for complete search history.

(56) References Cited

U.S. PATENT DOCUMENTS

2010/0162898 A1    7/2010    Mahlich
2014/0299001 A1    10/2014   Rimpl

OTHER PUBLICATIONS

Written Opinion for International Application No. PCT/EP2020/087925, "System and Method for Foaming Milk" date of mailing: Mar. 18, 2021.
International Preliminary Report on Patentability received for PCT Patent Application No. PCT/EP2020/087925, mailed on Jul. 7, 2022, 7 pages.

* cited by examiner

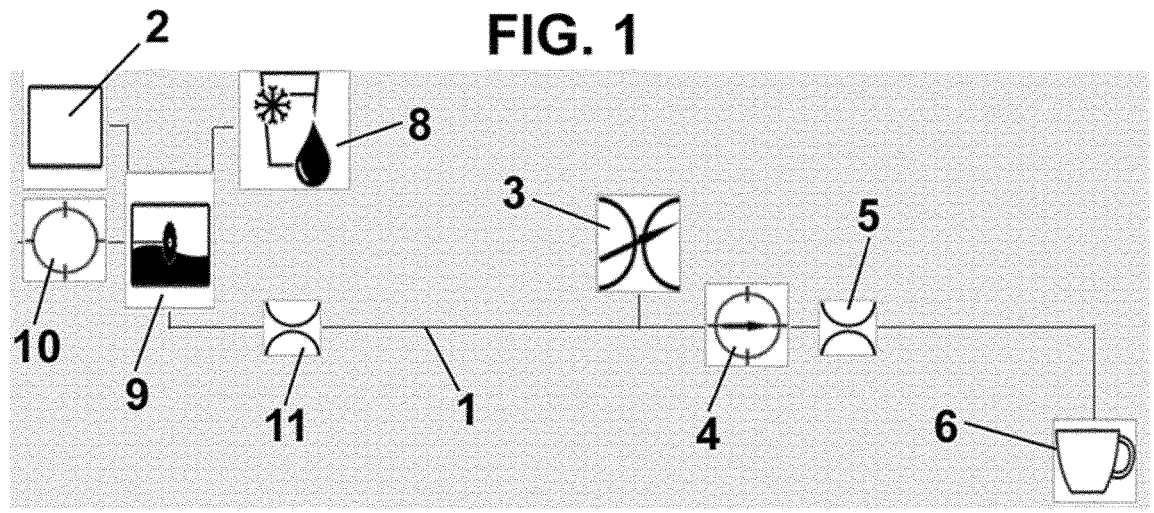
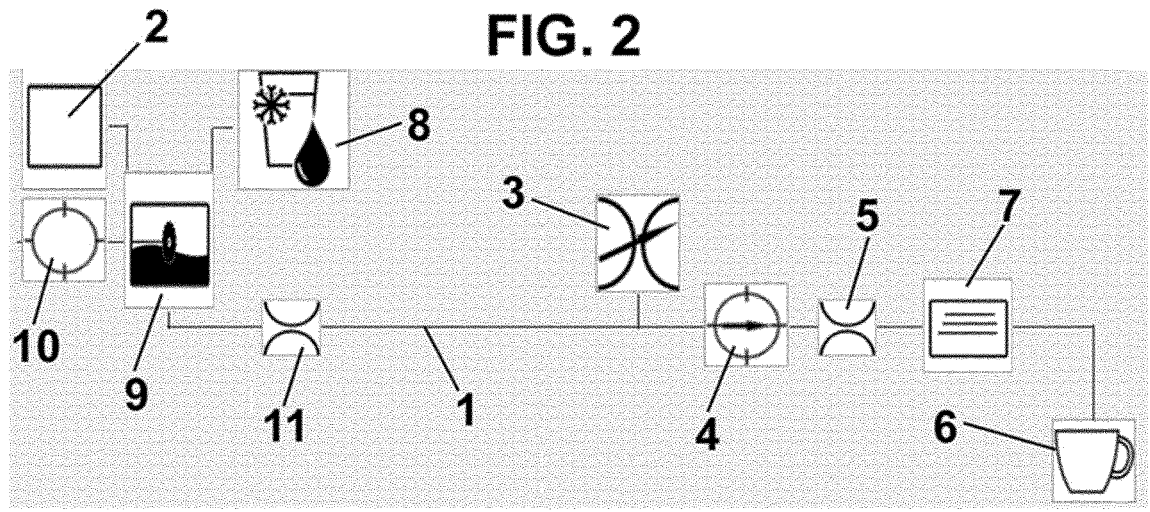

SYSTEM AND METHOD FOR FOAMING MILK

This application is the U.S. National Stage of International Application No. PCT/EP2020/087925, filed Dec. 28, 2020, which designates the U.S., published in English, and claims priority under 35 U.S.C. § 119 or 365 (c) to European Application No. 19383206.0, filed Dec. 27, 2019. The entire teachings of the above applications are incorporated herein by reference.

DESCRIPTION

The present invention relates to a system and a method for foaming milk, which can be applied, in particular, to a coffee dispensing machine.

BACKGROUND OF THE INVENTION

Milk foam is achieved by mixing milk and air. Depending on the volume percentage of air in the milk, a milk foam that is more or less dense is achieved. Thus, when the percentage of air is 20%, for example, when the foam is poured into a glass, a dividing line is observed between the liquid phase and the foam phase. This dividing line is more evident when coffee is poured: the foam phase staying white and the liquid phase being coloured.

The properties of this mixture remain more or less constant when increasing the percentage of air in the milk, up to approximately 70%. This type of foam is known the best.

When the percentage of the air exceeds 75% of the total volume of the mixture, a milk foam-gel is obtained characterised in that:
  The foam has very fine bubbles: the texture of the surface of the foam seems smooth to the naked eye.
  The foam is not very dense (>75% air).
  The foam modifies the texture thereof until it becomes a gel, with a molecular texture close to being solid. This gel texture is observed since it is able to generate a small "mountain" when it flows, i.e. the structure thereof is sufficiently rigid so as to support the weight thereof.
  Another aspect that indicates that the foam has reached the gel phase is that when it is collected with a spoon, the foam is able to maintain its shape without being crushed under its own weight.
  The foam, due to the air-bubble structure thereof, behaves as a thermal insulation material, helping to keep the liquid on which it floats hotter.

When the amount of air exceeds 90% of the volume of the mixture, the milk foam is not able to maintain the structure thereof and a mixture with small and large bubbles is produced, i.e. the texture thereof ceases to be homogeneous to the naked eye.

The outflow of this type of foam in the cup is not homogeneous, but rather interruptions and discontinuities are observed.

In the state of the art, systems for producing foamed fresh milk are known which require the fluid to be mixed with steam.

This implies having a steam production system, usually a pressure boiler, and the steam, which is hotter than 100° C., can cause burns when handled.

Furthermore, the steam is able to be compressed, and when it is heated, it increases in volume or pressure, depending on the container it is in, which implies that the system must be subject to specific safety measures and regular inspections.

The known solutions also use liquid milk as a raw material, which is foamed by different means in order to achieve foamed milk. This liquid milk must be changed periodically in order to ensure that it is maintained in the suitable condition, which can be a drawback depending on the use of the coffee dispensing machine.

For example, UHT milk has an expiry period of 48 hours, and must be stored in a refrigerator once opened (<5° C.). Furthermore, the liquid milk is a fertile medium for bacteria, for which reason daily cleaning is necessary which ensures the absence of bacteria in the circuit.

DESCRIPTION OF THE INVENTION

Therefore, an objective of the present invention is to provide a system and method for foaming milk to be provided which achieves the foaming of the milk with a "gel" effect from dehydrated powdered milk, the durability of which is much greater than liquid milk.

The mentioned drawbacks are resolved with the system and the method for foaming milk of the invention, while presenting other advantages which will be described below.

According to a first aspect, the present invention relates to a system for foaming milk, comprising:
  a container for milk;
  an air inlet;
  a pump, wherein liquid milk is mixed with the air in order to produce foamed milk; and
  an outlet, wherein foamed milk is supplied,
  wherein the container is a container for powdered milk, and the system for foaming milk further comprises a tank for water and a premixing chamber, wherein the powdered milk is mixed with the water in order to produce the liquid milk which is subsequently mixed by means of the pump.

Advantageously, said mixing chamber comprises at least one blade, which is actuated by a motor.

Furthermore, the system for foaming milk advantageously comprises a throttle arranged at the outlet of said premixing chamber.

This throttle enables the flow of liquid milk to be limited before the mixing thereof with air in order to produce foamed milk and regulate the inlet ratio of liquid milk and air before the mixing thereof in order to produce foamed milk.

Preferably, said air inlet is arranged between the premixing chamber and the pump, and the system for foaming milk further comprises an additional throttle arranged at the outlet of said pump.

If the already-formed foamed milk is to be heated, the system for foaming milk according to the present invention may further comprise a heater arranged before said outlet for foamed milk.

According to a second aspect, the present invention also relates to a method for foaming milk, comprising the following steps:
  feeding milk;
  feeding air;
  mixing liquid milk with the air in order to produce foamed milk; and
  supplying foamed milk, wherein said milk is provided as powdered milk and is premixed with water in order to provide liquid milk which is subsequently mixed with the air in order to produce foamed milk.

Said method for foaming milk also preferably comprises the step of limiting the flow of liquid milk before the mixing thereof with air in order to produce foamed milk, and also preferably comprises the step of regulating the inlet ratio of liquid milk and air before the mixing thereof in order to produce foamed milk.

If desired, the method for foaming milk according to the present invention may further comprise a step of heating the foamed milk.

With the system and the method for foaming milk according to the present invention, the following advantages are achieved, among others:

Durability of the product, which is much greater for powdered milk than for liquid milk, since UHT milk has an expiry period of 48 hours, and must be stored in a refrigerator once opened (<5° C.).

It facilitates the cleaning and maintenance of the hydraulic system (ducts), since daily cleaning is no longer necessary;

It does not need a refrigerator in order to maintain the product, with the subsequent cost savings;

Product quality in the cup (gel-type foam) that is clearly differentiated from other systems for foaming milk is achieved (texture, flavour, visual effect during the production and temperature).

It should also be noted that the powdered milk necessary to feed the system must contain the suitable amount of milk proteins (mainly caseins) (between 1% and 6%, for example), in order to produce the milk foam with the desired gel effect. The dehydrated milk products commonly used in coffee dispensing machines are not suitable for this application because this amount of proteinases is different.

The consistency of the foam which is commonly achieved is not homogeneous nor does it achieve a stable percentage of more than 75% air; in other words, given the common techniques in coffee dispensing machines it is impossible to achieve the foam-gel like that achieved with the system and the method according to the present invention, nor is this milk foam-gel achieved by using the traditional systems for foaming milk by mixing with steam.

BRIEF DESCRIPTION OF THE DRAWINGS

To better understand what has been set forth, several drawings are attached in which a practical embodiment is schematically depicted merely by way of non-limiting example.

FIGS. 1 and 2 are block diagrams showing the components of the system for foaming milk according to the present invention, according to two possible embodiments.

DESCRIPTION OF PREFERRED EMBODIMENTS

FIG. 1 shows a first embodiment of the system for foaming milk according to the present invention.

According to this embodiment, the system comprises a circuit 1 which starts in a milk container 2 wherein powdered milk is housed.

This powdered milk is mixed with water from a tank 8, which is at room temperature, in a premixing chamber 9 in order to produce liquid milk.

This premixing chamber 9 comprises at least one blade which is actuated by a motor 10, and a throttle 11 is arranged at the outlet of said mixing chamber 9 in order to limit the flow of liquid milk before the mixing thereof with air in order to produce foamed milk and to regulate the inlet ratio of liquid milk and air before the mixing thereof in order to produce foamed milk.

From this premixing chamber 9, liquid milk is fed to the circuit 1. Furthermore, the system for foaming milk further comprises an air inlet 3, which feeds air to the circuit 1 for the mixing thereof with the liquid milk, a pump 4, wherein the mixing of the milk and the air is produced, an additional throttle 5 located in the outlet of the pump 4, and an outlet 6, wherein the foamed milk is provided, for example, to a cup.

The operations of the system for foaming milk according to the present embodiment are as follows:

The powdered milk from the container 2 is premixed with the water from the tank 8 in the premixing chamber 9 in order to produce liquid milk.

The liquid milk and the air from the air inlet 3 are sucked in by the hydraulic pump 4. Said mixture of milk and air is preferably mixed thanks to internal gears of the hydraulic pump 4.

Due to the fact that an additional throttle 5 is arranged at the outlet of the pump 4, the pressure at the outlet of the pump 4 increases, for example, higher than 0.3 MPa, in order to overcome the restriction on the flow. This causes the mixture of air and milk to be produced at a high pressure, making the foam production have a gel-like appearance.

Immediately after the additional throttle 5, the mixture of milk and air expands once again inside the circuit 1, producing a flow of milk foam-gel in the outlet 6.

The system produces gel-type foamed milk in a stable manner when the mixing is performed at a high pressure inside the pump 4, the additional throttle 5 being located immediately at the outlet of the pump 4.

From a physico-chemical point of view, milk foam is a colloid formed by air, water and the proteins of the milk (mainly caseins). This implies that the production of foamed milk is performed with any type of milk (skimmed, semi-skimmed, whole, lactose-free, etc.) as long as the amount of protein (caseins) is suitable (between 1% and 6%).

FIG. 2 shows a second embodiment of the system for foaming milk according to the present invention. For simplicity, the description of elements in common with the previous embodiment will not be repeated.

As seen in the embodiment described previously, the foaming system does not comprise any heaters, such that the production of the milk foam does not need to heat any of the fluids, for which reason the outlet temperature of the milk foam at the outlet 6 will be the temperature of the milk at the inlet.

However, if hot fresh milk foam is to be obtained, it is best for it to be heated after being produced in order to maintain the density and texture.

To do so, a heater 7, such as a heat exchanger, is incorporated between the additional throttle 5 and the outlet 6 to the cup.

Despite having referred to specific embodiments of the invention, it is evident for a person skilled in the art that the system for foaming milk which has been described is susceptible to a number of variations and modifications, and which all the mentioned details can be replaced with other technically equivalent ones without departing from the scope of protection defined by the attached claims.

The invention claimed is:

1. A system for foaming milk, comprising:
a container for milk;
an air inlet;
a pump, wherein liquid milk is mixed with the air in order to produce foamed milk; and
an outlet, wherein foamed milk is supplied,
wherein the container is a container for powdered milk, and the system for foaming milk further comprises a tank for water and a premixing chamber, wherein the powdered milk is mixed with the water in order to produce the liquid milk which is subsequently mixed by the pump; and
wherein the system for foaming milk further comprises a throttle arranged at the outlet of said premixing chamber and an additional throttle arranged at the outlet of said pump.

2. The system for foaming milk according to claim 1, wherein said premixing chamber comprises at least one blade.

3. The system for foaming milk according to claim 1, wherein said air inlet is arranged between the premixing chamber and the pump.

4. The system for foaming milk according to claim 1, which further comprises a heater arranged before said outlet for foamed milk.

5. A method for foaming milk, comprising:
feeding milk;
feeding air;
mixing liquid milk with the air in order to produce foamed milk; and
supplying foamed milk,
wherein said milk is provided as powdered milk and is premixed with water in order to provide liquid milk which is mixed with the air in order to produce foamed milk;
wherein the method comprises limiting the flow of liquid milk before the mixing thereof in order to produce foamed milk, and regulating the inlet ratio of liquid milk and air before the mixing thereof in order to produce foamed milk; and
the method further comprising additionally restricting the flow of the foamed milk after the mixing of the liquid milk with the air to produce the foamed milk, thereby producing gel-type foamed milk.

6. The method for foaming milk according to claim 5, wherein the powdered milk comprises milk proteins between 1% and 6% by weight.

7. The method for foaming milk according to claim 5, wherein the powdered milk is premixed with room temperature water.

8. The method for foaming milk according to claim 5, which further comprises heating the foamed milk.

* * * * *